INVENTORS H. H. ABBOTT
R. D. WILLIAMS
BY G. F. Kane
ATTORNEY

Oct. 7, 1958 H. H. ABBOTT ET AL 2,855,463

TELEPHONE SYSTEM INVOLVING THE DIALING OF EXTENSION STATIONS AT A CORDLESS P. B. X

Filed Feb. 21, 1956 6 Sheets-Sheet 2

INVENTORS H. H. ABBOTT
R. D. WILLIAMS
BY G. F. Kane
ATTORNEY

Oct. 7, 1958 H. H. ABBOTT ET AL 2,855,463

TELEPHONE SYSTEM INVOLVING THE DIALING OF
EXTENSION STATIONS AT A CORDLESS P. B. X

Filed Feb. 21, 1956 6 Sheets-Sheet 3

INVENTORS H. H. ABBOTT
R. D. WILLIAMS
BY G. F. Kane
ATTORNEY

INVENTORS H. H. ABBOTT
R. D. WILLIAMS
BY G. F. Kane
ATTORNEY

Oct. 7, 1958 H. H. ABBOTT ET AL 2,855,463

TELEPHONE SYSTEM INVOLVING THE DIALING OF EXTENSION STATIONS AT A CORDLESS P. B. X

Filed Feb. 21, 1956 6 Sheets-Sheet 5

INVENTORS H. H. ABBOTT
R. D. WILLAMS
BY
A. F. Kane
ATTORNEY

INVENTORS H. H. ABBOTT
R. D. WILLIAMS
BY
A. F. Kane
ATTORNEY

United States Patent Office 2,855,463
Patented Oct. 7, 1958

2,855,463

TELEPHONE SYSTEM INVOLVING THE DIALING OF EXTENSION STATIONS AT A CORDLESS P. B. X

Henry H. Abbott, Yonkers, N. Y., and Robert D. Williams, Parsippany, N. J., assignors to Bell Telephone Laboratories, Incorporated, New York, N. Y., a corporation of New York Application February 21, 1956, Serial No. 567,016

5 Claims. (Cl. 179—27)

Figure 1:
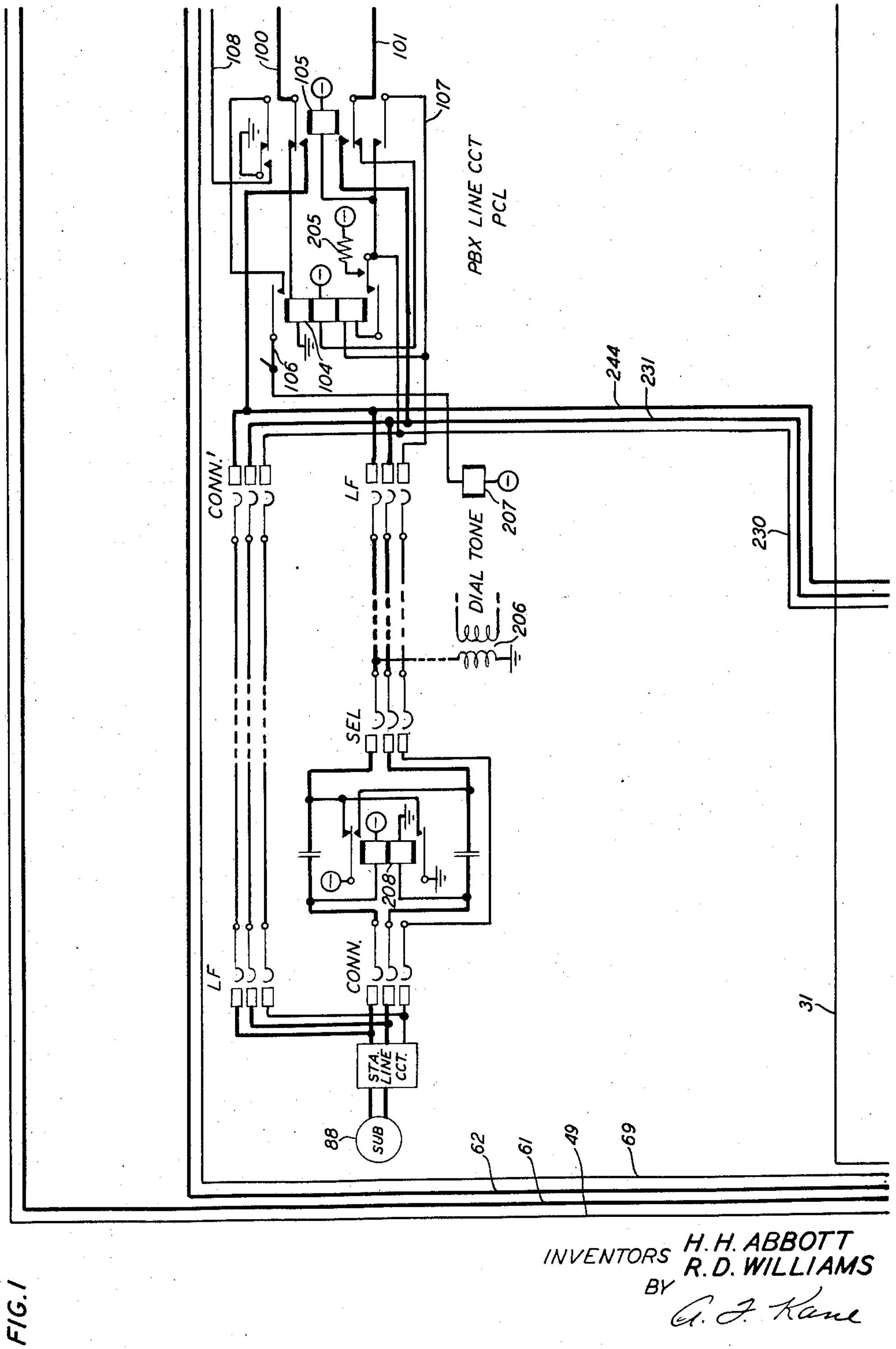

This invention relates to telephone systems and particularly to cordless, or key-operated private branch exchange systems for use on subscribers' premises.

Early in the evolution of the dial-type private branch exchange, it was realized that the volume of calls requiring operator assistance would frequently be too small to justify a switchboard. This realization resulted in the development and use of so-called cordless, or key-operated turrets which could be located on a desk or table and which would leave the attendant free to handle other business or to act as a receptionist in addition to handling telephone calls.

It is the object of this invention to provide an improved type of cordless, or key-operated private branch exchange system which provides a maximum of automatic operation with a minimum of equipment; permits simplified operating procedures with a minimum amount of attention on the part of the attendant; and which is otherwise conducive to an overall structural design which requires a minimum of working space.

This object is attained, in accordance with features of the invention, by the provision of a novel type of auxiliary trunk circuit which functions to terminate the usual central office private branch exchange trunk in one of a number of similar trunk-identifying pickup keys, or buttons located at an attendant's position and associated with a standard-type telephone set, and which embodies circuit design features which enable regular and improved services of a private branch exchange attendant to be rendered with a minimum of equipment.

A particular feature of the invention contemplates the use of a single lamp signal at an attendant's position to provide a multiplicity of distinctive signals. More particularly, a single trunk lamp is used to distinctively indicate such traffic conditions, with respect to the trunk, as trunk idle, trunk busy, call waiting, hold, and recall.

Another feature of the invention enables a single key, called the "hold" key, to be used by an attendant for a plurality of functions. For example, such key is used (1) to control the holding of central office connections; (2) to start the extension of such connections to private branch exchange stations; and (3) to release such connections when the called station is busy, or when the called party wishes to transfer an incoming call to another line. Heretofore, separate keys were required for these independent functions. The provision of a single key for all of these functions constitutes an important improvement in the design of private branch exchange attendants' station apparatus and one which contributes to simplicity and compactness of the overall design of cordless type private branch exchanges.

A related feature of the invention provides means whereby a dialing operation, performed by an attendant in extending an incoming call to an extension station after the hold key has been operated to effect the holding of a central office connection, renders the usual reoperation of a pickup key, in reconnecting to a trunk, ineffective to release the established hold connection. More particularly, after the attendant has placed a hold condition on the trunk by the operation of the hold key, she can remove it by either one of two procedures: (1) if she does not dial to complete the call to a private branch exchange station she removes the hold condition when she reconnects her telephone set to the trunk by operating the corresponding trunk pickup key; or (2) if she dials to complete the call, the hold condition can be removed only by operating the hold key a second time. After dialing, the hold condition will not be removed by subsequent operation of the pickup key, after the pickup key has once been released. The attendant is thus enabled to give reports to the calling party from time to time, while awaiting the answer of the private branch exchange station, without operating the hold key each time she disconnects from the trunk. This feature of releasing the hold condition by a subsequent operation of the hold key is a part of the improved operating procedure that enables the use of key telephone sets and small key boxes at the attendant's position.

A still further feature provides so-called "delayed through" supervision on an incoming call from a central office trunk to a private branch exchange extension station. When the station switchhook is operated, as for example on a recall, with each on-hook condition persisting for less than one second, the supervisory signals are not transmitted to the central office. However, when the station on-hook condition persists for more than one second, the resulting signal is transmitted to the central office as a disconnect signal. This "delayed through" supervision is an important feature in that it permits ready recall of private branch exchange attendants from private branch exchange extension stations without the heretofore usual hazards of accidental disconnects at the central office.

These and other features of the invention will be readily understood from the detailed description, to be made hereinafter, when read with reference to the accompanying drawings, Figs. 1 to 6 of which, when arranged as indicated by the block diagram of Fig. 7, constitute a circuit diagram of a cordless, or key-type private branch exchange system embodying the features of the invention.

Before entering into the detailed description of the operation of the system disclosed in the drawings, a brief reference to the general makeup of the illustrated embodiment of the invention will be made. In the drawings, Figs. 2 and 4 disclose a group of auxiliary trunks the first of which, designated ATR, is shown in complete detail and the second and last trunks, 2ATR and LATR, respectively, are represented by appropriately labeled blocks. Such trunks function with a central office trunk circuit represented by the block at the extreme right of Fig. 2 in extending calls to the private branch exchange attendant's position ATP shown in Fig. 5, and provide suitable supervisory and control signals in connection with a key telephone set or key equipment for the attendant. Each trunk appears before the private branch exchange attendant in a pickup key and associated signal lamp. The attendant is equipped also with the usual type of telephone set and a hold key which is common to all of the trunks appearing at pickup keys. In Fig. 5, the key equipment is shown comprising six keys A, B, C, E, F and G, each of which except the last, in the illustrated embodiment, terminates either a trunk directly, or by way of an attendant's restricted circuit shown at the lower right of Fig. 5, or an attendant's line circuit. By way of example, the keys A, B and E are shown terminating the trunks ART, 2ATR and an undisclosed thrid trunk 3ATR directly, while the key E is shown associated with the trunk LATR by way of the contacts of the pickup relay 223 of the attendant's restricted circuit, and the key G is utilized as the hold key. The key C, in the exemplary disclosure, is utilized to identify the attendant's line circuit ALC by way of which calls originated at the attendant's position and directed to private branch exchange stations, such as station 88, or originated at such stations and directed to the attendant's position may be completed. Each trunk is provided with three sets of leads comprising, respectively, conductors 61, 62, 49, 31 and 69 which extend to the key and signaling equipment at the attendant's position; conductors 100, 101 and 108 which connect the trunk to a private branch exchange line circuit, such as PCL, by way of which incoming calls from the central office received at the attendant's position may be transferred to private branch exchange stations, such as station 88, by way of the usual automatic switches; and conductors 86, 226, 82 and 81 which serve to render a trunk restricted with respect to the attendant, when connected to contacts of a pickup key by way of the attendant's restricted circuit shown at the lower right of Fig. 5.

Figure 6:
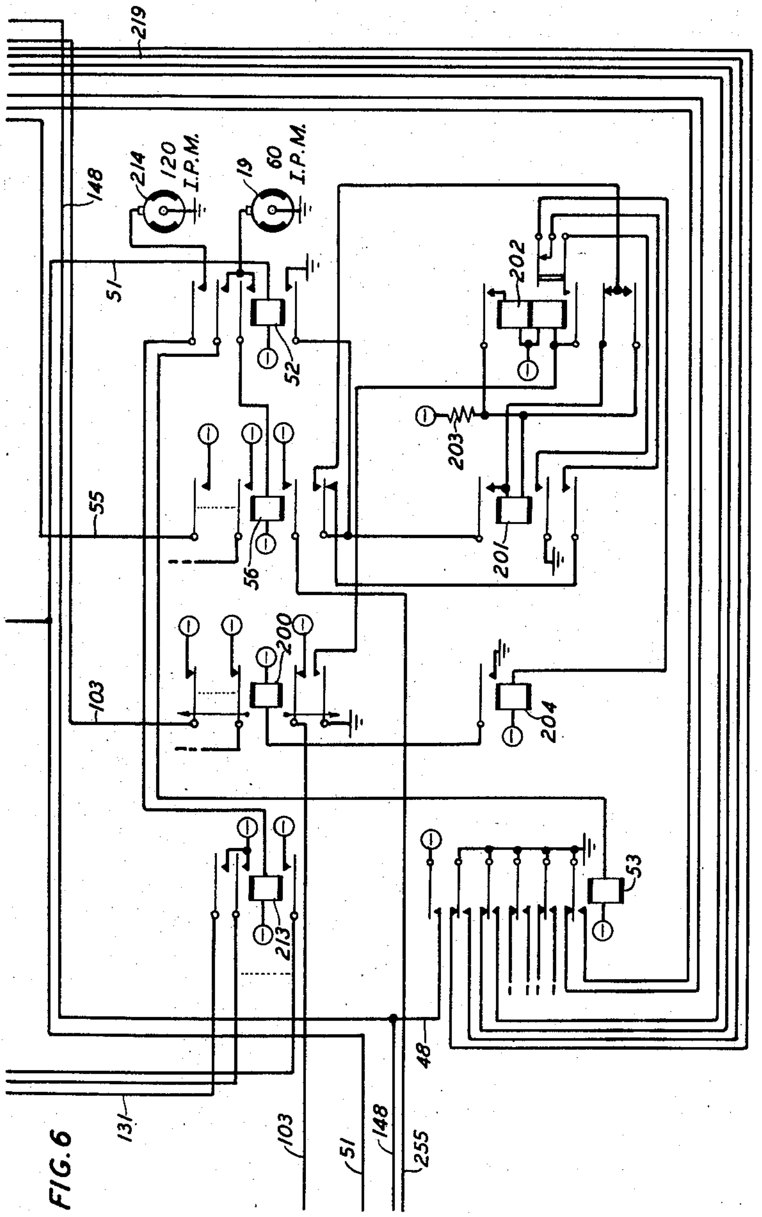
Figure 7:
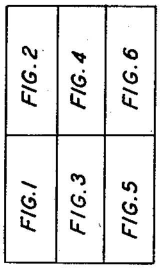

The signal control means by which the attendant's trunk lamps are operated at several different frequencies to indicate a corresponding number of distinctive circuit conditions, are shown in Fig. 6 and comprise, specifically, timing, flashing and winking circuits. These circuits are common to a number of trunks and the functions performed thereby are initiated in response to the operation of a start relay 52. Incident to the operation of relay 52, conditions are set up whereby the trunk lamps may be flashed at either a 60 interruptions per minute rate, at a 120 interruptions per minute rate, or may be caused to wink at a 30 interruptions per minute rate, depending upon the nature of the information to be imparted by the signal.

The operation of the system disclosed in the drawings will now be described.

*Incoming call*

Figure 2:
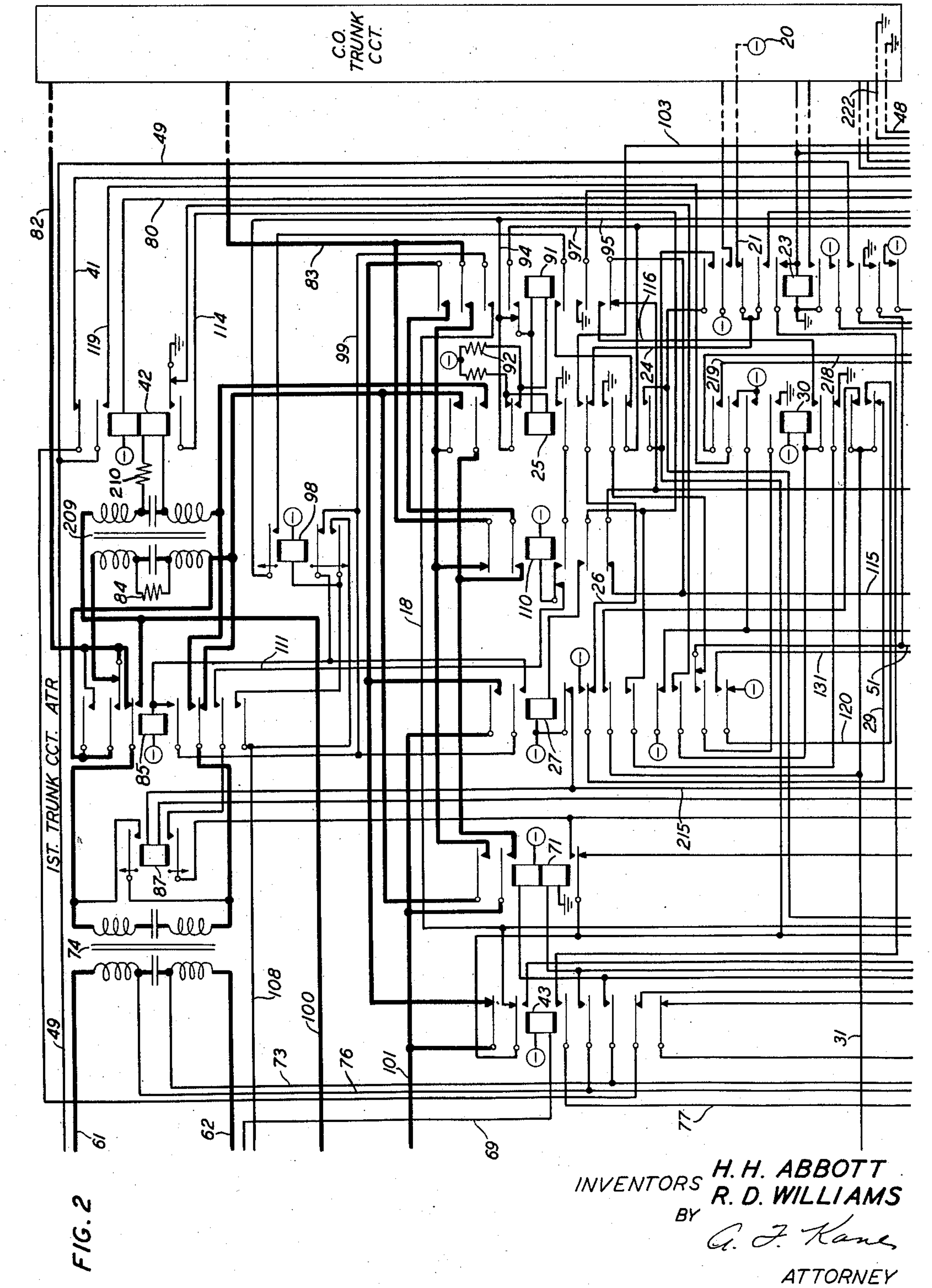
Figure 3:
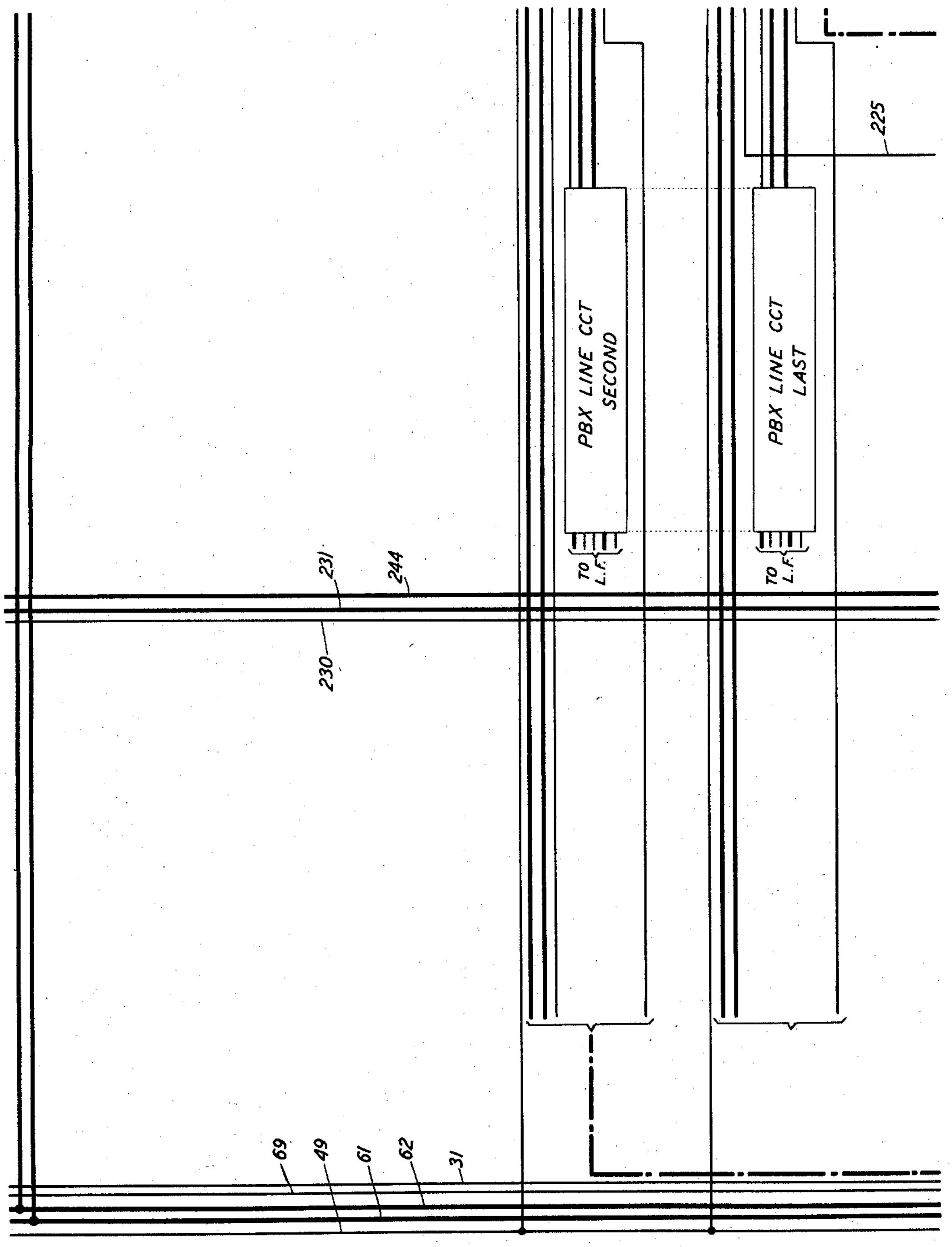
Figure 4:
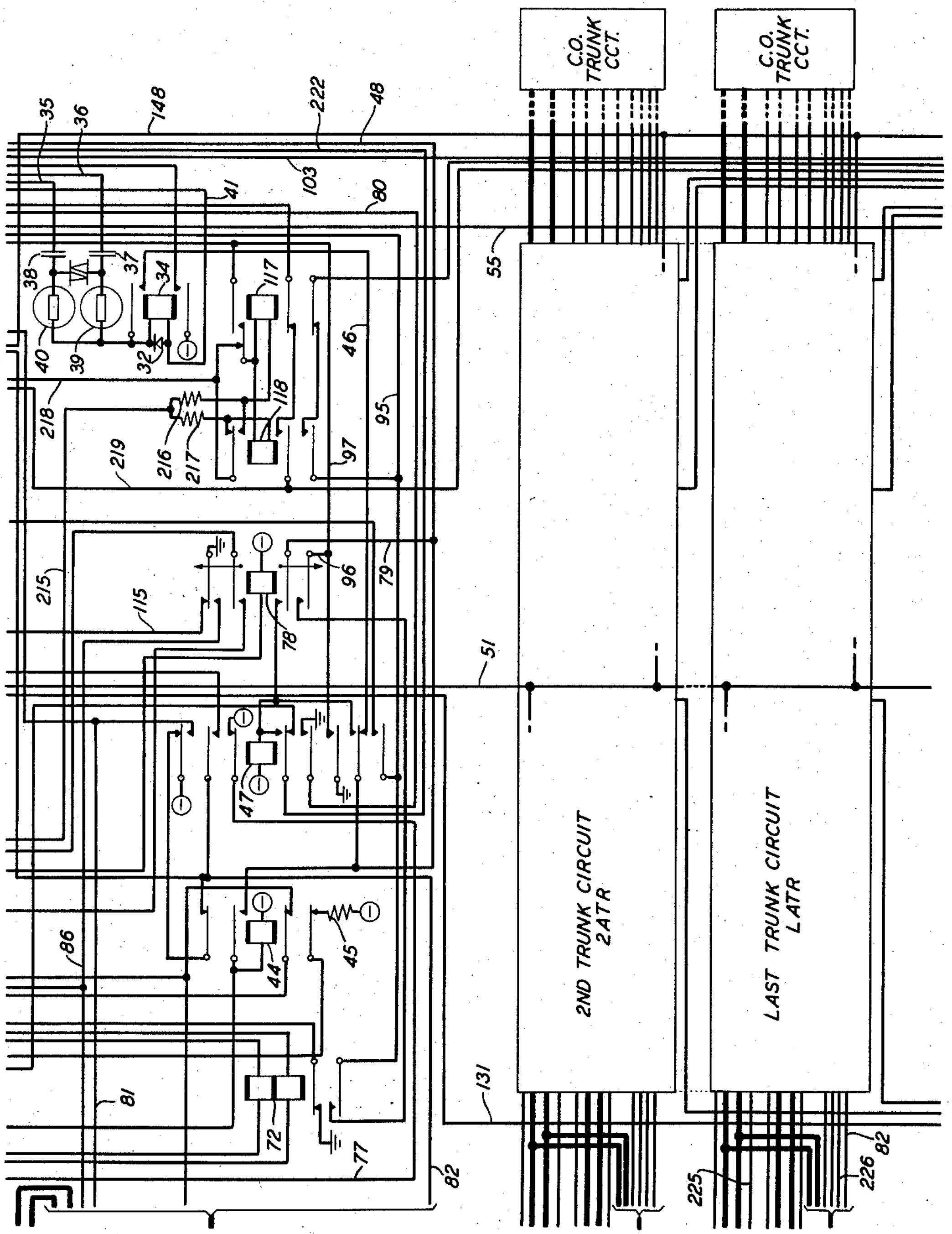
Figure 5:
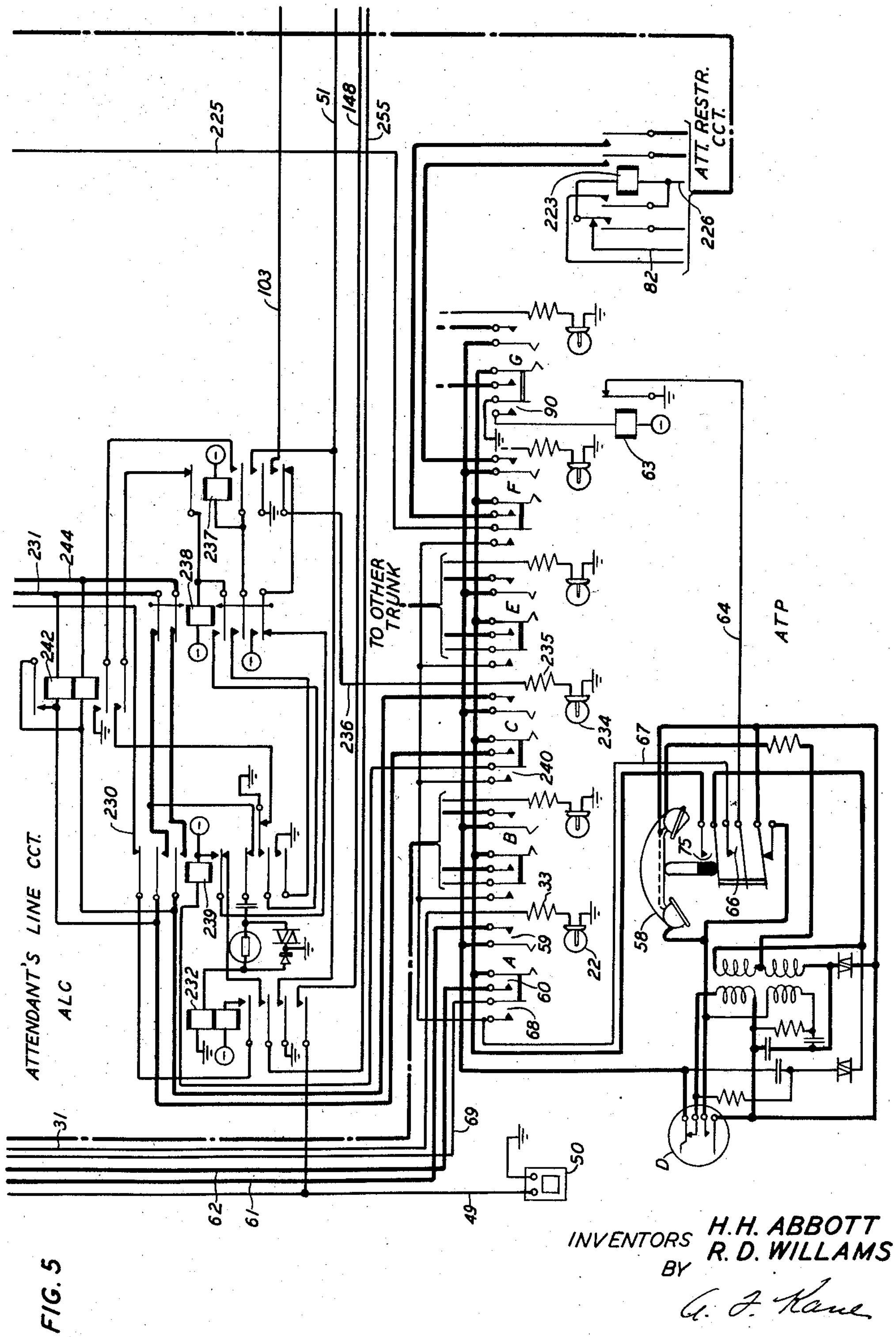

When an auxiliary trunk circuit such as the first trunk ATR of the group indicated in Figs. 2 and 4, is seized incidental to the extension of a call from the central office CO to the attendant's position ATP, shown at the bottom of Fig. 5, by way of the usual central office trunk circuit represented by the appropriately labeled block, negative battery indicated at 20 is connected to the lead 21 in any well known manner. A circuit is thereupon completed for the operation of trunk lamp 22, located at the attendant's position ATP, which includes negative battery 20, conductor 21, back contact and armature of relay 23, conductor 24, back contact and armature of relay 25, conductor 26, back contact and armature of relay 27, conductor 29, back contact and armature of relay 30, conductor 31, resistor 33, filament of lamp 22 and ground. The lamp 22 is individual to the trunk ATR and is lighted steadily in the circuit just traced as an indication to the attendant at the position ATP that the trunk ATR is busy. The prior dark condition of the lamp 22 indicated the idle condition of the trunk.

Also, upon seizure of the trunk ATR and the consequent connection thereto of ringing current in well known manner, relay 34 operates in a circuit which includes conductors 35 and 36, condensers 37 and 28, thermistors 39 and 40, rectifier 32 and the winding of relay 34, conductor 41, armature and back contact of relay 42, back contact and armature of relay 43, armature and back contact of relay 44, resistor 45 and negative battery. Relay 34, operated, locks over its own front contact and armature, conductor 46, back contact and armature of relay 47, conductor 48 to ground in the central office trunk. Relay 34 thus is locked under control of relays 47 and 43. Relay 34 causes relay 23 to operate over an obvious circuit.

Relay 23, operated, prepares a locking circuit for itself by way of its front contact and its innermost upper armature. At its middle lower armature and front contact, relay 23 connects the conductor 49 to conductor 148 to complete an operating circuit for the audible buzzer signal 50 located at the attendant's position ATP. Incidental to the operation of relay 23, ground potential at the fourth lower armature and front contact is connected to conductor 51 to complete an obvious operating circuit for "start" relay 52. Relay 52, operated, completes an obvious operating circuit to relay 53 which includes the 60-cycle interrupter 19. Relay 53 accordingly operates and releases in unison with the interruptions of interrupter 19 and causes the intermittent application of negative battery to the conductor 148 and thence to the buzzer 50 by way of conductor 49. The audible signal 50 accordingly is operated intermittently to supplement the visual signal 22 which, as will now be described, is operated intermittently as a call signal.

When relay 52 operated, it also connected the interrupter 19 in circuit with the winding of relay 56 so that relay 56 also operates under control of interrupter 19 to intermittently interrupt the connection of negative battery to conductor 55 at the rate of 60 interruptions per minute, which conductor, incidental to the operation of relay 23, is substituted for conductor 21 in the control circuit of trunk lamp 22 at the attendant's position. The lamp 22 is thus caused to flash at the rate of 60 interruptions per minute as a call signal. Thus far, the lamp 22, originally dark to indicate an idle trunk, has been caused to be lighted steadily to indicate the busy condition of the trunk and to flash at the rate of 60 interruptions per minute to indicate the arrival of a call at the attendant's position by way of the trunk.

*Attendant answers*

Upon hearing the buzzer signal 50 and noting the flashing of trunk lamp 22, the attendant proceeds to answer the incoming call on trunk ATR by operating the corresponding pickup key A and removing the telephone handset 58 from its support. The attendant's telephone equipment, shown at the lower left corner of Fig. 5, functions so that when the handset is removed from its support, the telephone is connected to the tip and ring conductors 61 and 62 of a trunk, such as the trunk ATR, which has its corresponding pickup key, such as key A, operated, the connection being completed by way of contacts 59 and 60 of the operated key.

It will be noted that with pickup key A operated, ground potential at the armature and back contact of relay 63, (Fig. 5) is extended over conductor 64, the switchhook contact 66, conductor 67, contact 68 of pickup key A, to conductor 69 and thence through the winding of relay 43 (Fig. 2) to negative battery. Relay 43 operates in this circuit.

Relay 71 now operates in a circuit extending from negative battery, over the upper winding of relay 71, the front contact and middle lower armature of relay 43, conductor 73, the lower left winding of repeating coil 74, ring conductor 62 of trunk ATR, contact 60 of pickup key A, switchhook contacts 75, through the closed loop at the attendant's station, contacts 59 of pickup key A, tip conductor 61 of trunk ATR, upper left winding of repeating coil 74, conductor 76, second lower armature and front contact of relay 43, lower winding of relay 71, to ground. It will be noted that the windings of relay 72 are shortcircuited by the armature contacts of relay 43 at this time, so that relay 72 does not operate.

Relay 43, operated, completes the holding circuit for relay 23 which includes conductor 77, armature and front contact of relay 43, outermost upper armature and back contact of relay 47, and negative battery. Relay 78 also operates as a consequence of the operation of relay 43 in a circuit which includes negative battery, the winding of relay 78, front contact and lower armature of relay 71, inner upper armature and front contact of relay 43, armature and inner lower back contact of relay 72, and ground. Relay 78, operated, locks under control of relay 71.

Relay 47 now operates in a circuit which includes negative battery, the winding of relay 47, front contact and inner lower armature of relay 78, conductor 79 and ground on lead 48. Relay 47 locks independent of relay 78 to ground on conductor 48 by way of its fourth lower armature and front contact. At its second lower armature and front contact, relay 47 completes an energizing circuit for the biasing, or upper winding of relay 42 by way of conductor 80. Relay 47 also connects "off normal" ground to the circuit; connects negative battery to conductors 81 and 82 (of no immediate consequence), the former getting battery directly at the outermost upper armature and front contact of relay 47 and the latter getting battery at the fourth lower armature of relay 27 by way of the second lower armature and front contact of relay 47; and opens the holding circuits of relays 23 and 34, allowing these relays to release.

Relay 23, released, silences the attendant's buzzer 50 by interrupting conductors 49 and 148 and, at its second and third upper armatures transfers the circuit to trunk lamp 22 from conductor 55 back to conductor 21, thereby causing the lamp to again light steadily.

Relay 71, operated, closes the tip and ring conductors 82 and 83 of the central office trunk through resistor 84 to trip the ringing in well known manner, and to complete the transmission circuit from the central office to the attendant's position ATP by way of repeating coil 74 and normal armature contacts of relays 85 and 110. The connection of the right windings of repeating coil 74 to the central office trunk may be traced from the tip conductor 82, over the back contact and armature of relay 85, right windings of coil 74, armature and back contacts of relay 85, front contacts and outer upper armature of relay 71, back contact and outer upper armature of relay 110, to ring conductor 83.

Relay 78, operated, grounds conductor 86 for a purpose which will appear from a later description and prepares an operating circuit for relay 87.

With the completion of the transmission path between the attendant's telephone set and the central office, by way of repeating coil 74, the attendant may converse with the calling party.

*Attendant holds central office*

It will now be assumed that the calling party desires to be connected to the private branch exchange extension station 88 shown at the left of Fig. 1, and so advises the attendant at position ATP. The attendant thereupon actuates the hold key G momentarily and, upon receipt of dial tone, proceeds to operate the dial D in accordance with the numerical designation of the substation 88.

The momentary operation of hold key G causes the momentary operation of relay 63 over a circuit which includes contacts 90 of key G. Ground potential is thus momentarily removed from conductor 64 and, therefore, from conductor 69 to effect the momentary release of relay 43. Upon release of relay 43, the short circuits about the windings of relay 72 are removed and relay 72 operates in series with relay 71 over the closed station loop. Relay 72 releases when relay 43 reoperates and again short-circuits the windings of relay 72. Thus relay 72 operates and releases in response to the momentary operation of key G.

Relay 72, operated, connects "off normal" ground at the middle lower armature and front contact of relay 47 to the lower armature and front contact of relay 78 by way of conductors 96 and 97, thence over the front contact and outer lower armature of relay 72, conductors 95 and 94, normal continuity contacts and winding of relay 91, resistor 92, to negative battery. Relay 91 operates in this circuit, it being noted that the winding of relay 25 is short-circuited at this time. Relay 91, operated, locks to ground under control of relay 47 by way of conductor 97. When relay 72 releases, relay 25 operates. Relay 91 also causes "transfer" relay 85 to operate in a circuit which includes negative battery, the winding of relay 85, armature and back contact of relay 98, conductor 99, armature and front contact of relay 91, conductors 18 and 86, front contact and outer upper armature of relay 78 and ground. Relay 85 locks operated, independent of relay 98, to ground at the said outermost upper armature of relay 78.

Relay 25, operated, holds the transmission path closed to the central office independent of relay 71; closes the circuit to the tip and ring conductors 100 and 101 to the private branch exchange line circuit PCL through the lower winding of relay 42; and at its middle lower armature and front contact, completes an operating circuit for start relay 52 (Fig. 6) which includes negative battery, the winding of relay 52, conductor 51, normal continuity contacts of relay 27, middle lower armature and front contact of relay 25, and ground. At its second lower armature and front contact, relay 25 completes a circuit which includes ground, the filament of trunk lamp 22, resistor 33, conductor 31, armature and back contact of relay 30, conductor 29, second lower armature and back contact of relay 27, conductor 26, second lower armature and front contact of relay 25, conductor 103, armature and back contact of relay 200, and negative battery. The lamp 22 is caused to "wink" in this circuit to indicate that the trunk ATR is being held. When start relay 52 operated, as described, relay 56 operated under control of the 60 interruptions per minute interrupter 19. Relay 56, operated, connects negative battery to the conductor 55 and connects ground at the lower armature and front contact of relay 52 to the winding of relay 201 by way of the outer lower armature and front contact of relay 56, back contact and middle armature of relay 202, winding of relay 201, and thence by way of resistor 203 to negative battery. Relay 201 operates and locks to ground at the lower armature and front contact of relay 52. Relay 201, operated, prepares the operating path of relay 200. When relay 56 releases under control of the interrupter 19, relay 204 operates which, in turn, operates relay 200. Relay 200, operated, removes negative battery from the group of leads including conductor 103, and operates relay 202 by way of its lower winding. Relay 202, operated, locks to relay 201 over an obvious circuit and opens the operating path of relay 204. Relay 200 is slow-to-release in order to keep negative battery off the leads, such as lead 103, for a short interval of time. When relay 200 releases, negative battery is again connected to the group of leads which includes conductor 103. When relay 56 reoperates, ground at the lower armature and front contact of relay 52 is connected to the upper winding of relay 202 to hold that relay operated, and is connected to both ends of the lower winding of relay 201 to shunt that relay down. When relay 56 releases, the next time, relay 202 is released. The next time relay 56 operates, relay 201 is operated and the operation is repeated as described above. Thus, the repeated applications of negative battery to the conductor 103 cause the lamp 22 at the attendant's position to "wink" at a rate of 30 interruptions per minute as a hold indication, the lighted interval lasting 1.7 seconds and the dark interval lasting 0.3 second.

Relay 85, operated, places a short circuit across the tip and ring conductors 82 and 83 to the central office to prevent transmission in that direction at this time; transfers the attendant's telephone set to the private branch exchange line circuit PCL; prepares the operating circuit for relay 110; and closes the operating path of relay 98. When relay 85 operates and the attendant's telephone is connected to the line circuit PCL, relay 104 (Fig. 1) in the line circuit operates over the closed loop at the attendant's station, its uppermost and middle windings and normal armature contacts of cut-off relay 105. At its inner upper armature and front contact, line relay 104 extends ground potential at the back contact and outer upper armature of relay 105 to conductor 106 of the control circuit of line finder LF to cause the operation of the start relay 207 of the line finder. The line finder, in well known manner, hunts for the line circuit PCL and connects the tip, ring and sleeve conductors thereof through to the selector SEL. Relay 104, operated, also closes the circuit of the windings of relay 105 which windings include the secondary winding shown at 205, in series with its own primary or lowermost winding to the sleeve conductor of the line finder. When the line finder LF attaches itself to the line PCL, the cut-off relay 105 operates in well known manner, and opens the lead 106; places a ground on the sleeve conductor 108; locks to the sleeve conductor; and finally releases relay 104. The sleeve of the associated connector bank CONN' is made busy as soon as the line finder attaches itself to the line.

Ground potential on conductor 108 causes relay 98 to operate in a circuit which includes negative battery, the winding of relay 98, front contact and outermost lower armature of relay 85, conductor 108 and the make-before-break contacts and outer upper armature of cut-off relay 105, and ground. Relay 98, operated, locks to conductor 108 independent of relay 85 and opens the operating path of relay 85. Relay 85, however, remains locked operated under control of relays 91 and 78, over conductor 99.

As soon as the selector SEL is connected to the line PCL, dial tone from the source 206 is connected over the established connection to the attendant's position as an indication to the attendant that the private branch exchange automatic switches are ready to receive dial pulses. It is apparent from the description thus far made, that the hold key G at the attendant's position functions not only to effect the holding of the central office connection, but also to initiate the extension of such connection to a private branch exchange station, such initiation being accompanied by the application of dial tone to the attendant's telephone set.

*Attendant completes call*

When the private branch exchange circuits return dial tone, as described, the attendant operates the dial D in accordance with the station designation of the desired station 88. As previously described, the windings of relay 71 of the trunk ATR are connected to the tip and ring conductors 61 and 62 of the trunk to which the attendant's telephone equipment, which includes the dial D, is also connected. Relay 71 accordingly releases and reoperates in response to the dial pulses. Relay 78, being slow-to-release, remains operated during pulsing. Relay 87 operates on the first release of relay 71 and, being slow-to-release, also remains operated during pulsing. Relay 87, operated, places a short-circuit across the right windings of repeating coil 74 to improve pulsing, and, at its lower armature and front contact, prepares an operating circuit for relay 110. When relay 71 reoperates after relay 87 is operated, relay 110 operates in a circuit which includes negative battery, the winding and normal continuity contacts of relay 110, conductor 111, front contacts and armatures of relays 85 and 87, front contact and lower armature of relay 71, inner upper armature and front contact of relay 43, and ground on the inner armature and back contact of relay 72.

Relay 110, operated, prepares a path to hold the private branch exchange connection after the attendant hangs up. The attendant completes the dialing operation and the automatic switches, indicated by the selector SEL and connector CONN, function in well-known manner to extend the trunk conductors 100 and 101 to the called line and to signal the called station 88.

*Called station answers—attendant on line*

When the called station answers, supervisory relay 208 in the connector circuit operates over the called station loop and reverses the battery and ground connections to the tip and ring conductors of the established connection to cause supervisory relay 42 to operate. It will be noted that the operating, or lower winding of relay 42 has one terminal connected to the tip conductor 100 of the trunk section extending to the called station by way of the upper right winding of repeating coil 209 and resistor 210, while the other relay terminal is connected to the ring conductor 101 by way of the lower right winding of repeating coil 209, the front contact and middle upper armature of relay 25, and the front contact and inner upper armature of relay 71. Relay 42, operated, causes relay 27 to operate in a circuit which includes negative battery, the winding of relay 27, front contact and armature of relay 110, conductor 114, armature and front contact of relay 42, and ground. Relay 27, operated, locks in a circuit extending from negative battery, over the winding of relay 27, front contact and middle lower armature of relay 110, front contact and fourth lower armature of relay 27, to ground over the second lower armature and back contact of relay 30. This circuit, obviously, is independent of relay 42. Relay 27, at its front contact and second lower armature, connects steady battery to conductor 29 and thence to the grounded filament of trunk lamp 22 at the attendant's position by way of the back contact and outermost lower armature of relay 30, conductor 31, and resistor 33. The lamp 22 is thus lighted steadily as an indication that the called party at station 88 has answered.

The attendant and the party at the called station 88 can now converse, it being observed that speech transmission towards the central office is impossible at this time, because of the short circuiting of conductors 82 and 83 by relay 85. When the attendant disconnects, relays 43 and 71 release, since these relays were held operated under control of the switchhook contacts at the attendant's position. When relay 71 releases, the operating path of relay 78 is opened and this relay releases after a short interval of time. Relay 43, released, and relay 27, operated, hold the talking circuit to the private branch exchange closed when relay 71 releases. Relays 78, released, allows relay 85 to release. Relay 85, released, removes the short circuit from across the tip and ring conductors 82 and 83 and transfers the attendant's line back across the trunk. A speech transmission path is now completed between the private branch exchange station 88 and the central office which includes the repeating coil 209.

*Called station answers—attendant not on line*

Should the private branch exchange attendant disconnect before the called station 88 answers, relays 71, 43, 78 and 85 will release and the central office will hear audible ringing until the called station answers. When the called station answers, relays 42 and 27 will operate as described above.

*Recall*

In the event the party at the called station 88 desires to recall the attendant to the trunk ATR, the switchhook at station 88 is depressed momentarily. Relay 208 thereupon releases to reverse the current to relay 42 and thereby to cause relay 42 to release, and to reoperate when the original condition of the switchhook contacts at station 88 is restored. When relay 42 releases, relay 30 operates over an obvious circuit which includes the front contact and sixth lower armature of relay 27. Relay 30, operated, locks in a circuit which includes negative battery, the winding of innermost lower armature and front contact of relay 30, conductor 116, front contact and armature of relay 91, conductor 115, back contact and armature of relay 78 and ground. Relay 30 opens the locking circuit of relay 27 causing this relay to release, and closes the circuit in which to operate relays 117 and 118. When relay 42 reoperates, relay 27 is reoperated. Relay 42, operated, closes the circuit for the continuous operation of the attendant's buzzer 50, which circuit includes negative battery, the front contact and third upper armature of relay 30, conductor 119, front contact and armature of relay 42, conductor 49, buzzer 50 and ground. Relay 27, operated, removes negative battery from conductor 215 and, therefore, from relays 117 and 118; prepares a circuit to operate relay 85, and grounds the start conductor 51 to operate start relay 52. Relay 52, operated, causes relay 213 to operate under control of the 120 interruptions per minute interrupter 214. Relay 213 thereupon intermittently connects negative battery to a group of leads including conductor 131. Lamp 22 at the attendant's position now flashes at the rate of 120 interruptions per minute in a circuit which includes ground, the filament of lamp 22, resistor 33, conductor 31, the fourth lower armature and front contact of relay 30, conductor 120, armature and front contact of relay 27, conductor 131, the corresponding armature and front contact of relay 213 and negative battery. The flashing of lamp 22 at this rate indicates to the attendant that the called party at station 88 is recalling and desires her services again.

When the attendant answers the recall signal, relay 43 operates when ground is connected to conductor 69 incident to the operation of pickup key A. Relay 71 now operates over the closed loop at the attendant's station and causes relay 78 to operate as before. Relay 78, operated, opens the holding circuit for relay 30 causing this relay to release. Relay 30, released, reestablishes the locking circuit of relay 27; opens the circuit to the buzzer 50, thus silencing the audible signal; and causes lamp 22 at the attendant's position to be lighted steadily over an obvious circuit.

*Transfer*

In the event the party at the recalling station 88 desires to have the call incoming from the central office transferred to another station, the attendant is apprised of this fact and thereupon momentarily operates the hold key G. This operation momentarily removes ground from conductor 69, in a manner now apparent, allowing relay 43 to release and then to reoperate. When relay 43 releases, relay 72 operates in series with relay 71 in a manner previously described. Relay 72 operated, shunts down relay 91 by opening the circuit which includes conductors 95 and 94 and thereby removes off-normal ground from these conductors. Relay 25, however, is held operated. When relay 43 reoperates, relay 72 is shunted down and relay 25 releases. When relay 25 releases, relay 110 is released and the circuit between the tip and ring conductors 100 and 101 to the private branch exchange is opened allowing the private branch exchange connection to be released. Relay 110, released, opens the operating and holding paths of relay 27. When the private branch exchange connection drops off, ground is removed from sleeve conductor 108 causing relay 98 to release. Relay 42 will be released if the private branch exchange station disconnects before the attendant operates the hold key G. Otherwise, relay 42 will release when the new station is called, or when the circuit restores to normal. When relay 27 releases, the trunk lamp 22 at the attendant's position is lighted steadily to indicate that the trunk is busy. The energizing circuit for lamp 22 at this time includes negative battery, conductor 21, back contact and armature of relay 23, conductor 24, back contact and armature of relay 25, conductor 26, back contact and armature of relay 27, conductor 29, back contact and armature of relay 30, conductor 31, resistor 33, filament of lamp 22 and ground.

To establish the new call, the attendant reoperates the hold key G momentarily, causing the operation of relays 43 and 72 as before, whereupon relay 91 operates. If relay 98 is not released at this time, relay 91 is held operated and relay 25 is held released until relay 98 releases, to insure that a loop circuit is not reclosed to the private branch exchange before the previous connection is fully released. When relay 42 releases, relay 25 operates and the new call proceeds as though the attendant were completing an initial call.

*Disconnect—P. B. X station disconnects first*

When the private branch exchange station 88 disconnects, relay 42 releases as a result of the current reversal effected by the release of relay 208. Relay 42, released, operates relay 30 which, in turn, releases relay 27. With relay 30, operated, and relay 27, released, ground is connected to conductor 51 to operate relay 52 over an obvious circuit. Incident to the operation of relay 30 and the release of relay 27, a circuit for operating relays 117 and 118 is closed which includes negative battery, the first lower armature and back contact of relay 27, conductor 215, resistors 216 and 217, windings of relays 117 and 118, and their normal upper armature contacts, conductor 218, front contact and outermost upper armature of relay 30, conductor 219, front contact and armature of relay 53 and ground. It is understood that when relay 52 operated, as described, relay 53 was placed under the control of interrupter 19 so that this relay is intermittently operated at the rate of 60 interruptions per minute. Thus, ground is intermittently connected to the circuit just traced at the same rate. The first time ground is connected to the conductor 219, relay 117 operates and relay 118 is shunted down. When ground is removed from conductor 219, relay 118 operates. When ground is reapplied to conductor 219, relay 117 is shunted down. With relay 117 released and relay 118 operated, these relays are held in this condition by ground at the front contact and middle lower armature of relay 91. When ground is next connected to conductor 219 by relay 53, relay 91 is shunted down and relay 25 is held operated. Relay 91, released, allows relays 118 and 30 to release. Relay 25 remains locked operated under control of relays 47 and 78. Relay 91, released, opens the tip and ring conductors to the private branch exchange and to the central office. When the private branch exchange connection drops off, relay 98 releases. When the central office trunk releases, battery is removed from conductor 21 causing the lamp 22 to be extinguished, and ground is removed from conductor 48 allowing relay 47 to release. Relay 47, released, releases relay 25. The circuit is then restored to normal.

*Central office disconnects first*

When the central office disconnects, ground is removed from conductor 48 allowing relay 47 to release. Negative battery is also removed from conductor 21. Relay 47, released, allows relays 91 and 25 to release. Relay 25, released, releases relay 110 and opens the tip and ring conductors towards the private branch exchange allowing the private branch exchange connection to drop off and allowing relay 42 to release. When the private branch exchange connection drops off, ground is removed from conductor 108 allowing relay 98 to release. When relay 42 releases, relay 30 operates in a circuit which may be traced from negative battery, through the winding of relay 30, the sixth lower armature and front contact of relay 27, normal continuity contacts of relay 42 to ground. Relay 30, operated, allows relay 27 to release which, in turn, permits relay 30 to release. The circuit is then restored to normal and the trunk lamp 22 is extinguished.

*Incoming call not completed—station busy*

If the called private branch exchange station 88 is busy, the attendant will hear busy tone when dialing is completed, as is well known. The attendant then momentarily operates the hold key G to transfer the talking circuit back to the central office trunk in a manner now apparent. The release and reoperation of relay 43, incident to the momentary operation of key G, and the consequent operation and release of relay 72 releases relays 91, 25, 110 and 85. The attendant then reports the busy condition to the central office.

*Station does not answer*

If the called station is idle but does not answer, and the central office does not disconnect, the attendant picks up the trunk and reports the "don't answer" condition. When the attendant picks up the trunk, relay 85 is released and the talking path to the central office is established. If the attendant wishes to set up a call to another station, the operation is the same as for a transferred call previously described.

*Outgoing call to central office—call from private branch exchange*

If an outgoing call to the central office is made over the central office trunk from the private branch exchange, battery is connected to the conductor 21 lighting the attendant's associated trunk lamp 22 steadily to indicate the busy condition of the trunk. Also ground will be connected to conductors 48 and 222, the latter causing relay 44 to operate. Relay 44, operated, locks to ground on conductor 48 and removes battery from the winding of relay 34 to prevent that relay from operating on a re-ring. The call is advanced in the usual well-known manner.

*Call from attendant*

When the attendant originates a call to the central office, the handset 58 at the attendant's position is removed from its support and pick-up key A is operated thereby extending the tip and ring conductors 61 and 62 of the trunk, such as trunk ATR, to the attendant's telephone. Ground potential is connected to conductor 69 causing the operation of relay 43 in a manner previously described. Relay 71 now operates, as described heretofore, over the closed loop at the attendant's position and causes relay 78 to operate. Relay 71, operated, closes the circuit between the tip and ring conductors to the central office trunk. Relay 47 operates incidental to the operation of relay 78. Relay 47, operated, grounds the conductor 222 to the central office trunk to initiate the functioning of the trunk, which of itself constitutes no part of the present invention. When the central office trunk functions, the call is extended in known manner to the central office. The attendant then passes the desired number to the central office operator or dials. If the attendant dials, relay 71 releases and reoperates in response to the dial pulses, as previously described, and opens and closes the loop to the central office by way of its two upper armatures and front contacts. Relay 78, being slow-to-release, remains operated during pulsing. Relay 87 operates on the first release of relay 71 and remains operated until the pulse train is terminated. Relay 87, operated, short-circuits the right windings of repeating coil 74 to improve pulsing to the central office. The call is completed in well-known manner. If the attendant later wishes to extend the call to a private branch exchange station, such as station 88, the operation is the same as though the call had been received from the central office.

*Attendant restricted service—outgoing call*

If an attendant is to be restricted from making outgoing calls on a trunk or from seizing a busy trunk without being recalled, a pickup relay 223 (Fig. 5) is interposed between such trunk and the key termination of the trunk at the attendant's position ATP. In the illustrated embodiment, the last trunk circuit LATR of the illustrated group is selected, by way of example, to indicate a trunk to which such restricted service is applied. This trunk terminates at key F at the attendant's position. Should the restricted attendant attempt to seize the trunk LATR, conducor 225 receives ground potential from the armature and back contact of relay 63 in a manner now apparent whereupon relay 43 of the trunk LATR is operated. Relay 43, operated, completes a circuit from ground at the back contact and inner lower armature of relay 72 of trunk LATR, over a front contact and armature of relay 43, the outer upper armature of back contact of relay 44, conductor 226, the winding of relay 223 and its normal continuity contacts, conductor 82, and thence to the open upper armature contacts of relays 23 and 47. Since neither relay 23 nor relay 47 is operated at this time, relay 223 cannot operate to connect the trunk LATR through to the attendant's key 224 so that the attendant cannot reach the trunk.

*Incoming call*

When an incoming call is received, relay 23 will be operated, as previously described, and the operation of the pickup key F and the resulting operation of relay 43 causes relay 223 to operate to negative battery at the middle lower armature and front contact of relay 23 over the circuit traced in the preceding paragraph.

*Busy trunk*

When the trunk LATR is busy on a call which is outgoing from the private branch exchange, neither relay 23 nor relay 47 will be operated so that relay 223 cannot operate. When the trunk is busy on a call to the attendant or to a private branch exchange station from the central office, relay 223 may be operated as long as relay 27 is released indicating a "station on-hook" condition or as long as relay 30 is operated on recall or disconnect.

*Attendant's line—incoming call to attendant*

When a private branch exchange station, such as station 88, dials the connector terminals (CONN′) associated with the attendant's line ALC, Fig. 5, ground is connected to conductor 230 in well-known manner, and when ringing current is applied to the ring conductor 231, relay 232 in the attendant's line circuit operates over the ring conductor, in well-known manner, by way of its upper winding, and locks to the sleeve conductor 230 over its lower winding. Relay 232 at its third lower armature and front contact, connects ground potential to the start conductor 51 to cause relay 52 to operate. Relay 52 performs the same functions heretofore ascribed to it. At its outermost lower armature and front contact, relay 232 connects the attendant's buzzer 50 to conductor 148 so that when relay 53 operates under control of interrupter 19 incident to the operation of relay 52, the buzzer is operated intermittently. Lamp 234 associated with key C, which is assigned to the attendant's line circuit ALC, is now caused to flash in a circuit which includes ground, the filament of lamp 234, resistor 235, conductor 236, outermost lower armature and back contact of relay 237, armature and back contact of relay 238, innermost lower armature and back contact of relay 239, front contact and second lower armature of relay 232, conductor 255, front contact and armature of relay 56 and negative battery. As soon as relay 56 is operated under control of interrupter 19, the lamp 234 is caused to flash at the rate of 60 interruptions per minute as an incoming call signal. When the attendant answers by operating key C and removing the telephone handset 58 from its support, relay 239 operates in a circuit which includes negative battery, the winding of relay 232, contacts 240 of key C, conductor 67, switchhook contacts 66, conductor 64, back contact and armature of relay 63 and ground.

Relay 239, operated, releases relay 232, connects steady battery to conductor 236 to light the lamp 234 steadily to indicate that the attendant's line ALC is busy; completes the talking circuit to the calling station by way of its first and second upper armatures and front contacts; and short circuits the windings of relay 242 to prevent that relay from operating. When the attendant disconnects, relay 239 releases and the circuit is restored to normal.

*Outgoing call from attendant*

When the attendant makes an outgoing call to the private branch exchange, relay 239 operates incident to the operation of key C and the removal of the telephone handset 58 from its mounting, in a circuit which may be traced from negative battery, through the winding of relay 239, contacts 240 of key C, conductor 69, switchhook contacts 66, conductor 64, back contact and armature of relay 63 to ground. Relay 239, operated, extends the tip and ring conductors associated with the contacts of key C to the corresponding conductors 231 and 244 extending to the private branch exchange, and short circuits the windings of relay 242. The lamp 234 associated with key C at the attendant's position is now lighted steadily over a circuit which includes ground, the filament of lamp 234, resistor 235, conductor 236, armature and back contact of relay 237, armature and back contact of relay 238, armature and front contact of rely 239, and negative battery. The steady lighting of the lamp 234 indicates to the attendant that the attendant's line circuit ALC is busy. When the attendant hangs up, relay 239 releases and the circuit is restored to normal.

*Holding*

When the attendant wishes to hold either an incoming or an outgoing call, the hold key G is operated momentarily, causing the momentary operation of relay 63 and the consequent momentary removal of ground from the winding of relay 239, causing relay 239 to release. Relay 239, released, removes the short circuit from the windings of relay 242 and thereby permits relay 242 to operate in series with the attendant's telephone. Relay 242, operated, causes relay 238 to operate in a circuit which includes negative battery, the winding of relay 238, armature and back contact of relay 237, armature and front contact of relay 242, the normal continuity contacts of relay 239 and ground. At its upper armature, relay 242 closes a short-circuit across the tip and ring conductors leading to the attendant's telephone. Relay 238, operated, prevents relay 239 from short-circuiting the windings of relay 242; prepares the operating path of relay 237; and connects steady battery to the lead 236 to maintain the lamp 234 lighted steadily. When ground is reapplied to the winding of relay 239 this relay reoperates. Relay 239, operated, operates relay 237 over an obvious circuit, which includes the middle lower armature and front contact of relay 238. At its third lower armature and front contact, relay 239 establishes an obvious holding circuit for relay 238. Relay 237, operated, locks in a circuit controlled by the inner lower armature and front contact of relay 242; grounds the start lead 51 to operate relay 52; connects the lead 236 to conductor 103 to cause the lamp 234 to "wink" as an indication that the line is being held; and opens the operating path of relay 238. When the attendant hangs up, or operates another pickup key, relay 239 releases. Relay 242, however, remains operated over the tip and ring conductors 244 and 231 extending to the private branch exchange. Relay 239, released, releases relay 238. When the attendant picks up the line ALC again, relay 239 again operates. Relay 239, operated, short circuits the windings of relay 242 causing this relay to release. Relay 242, released, releases relay 237 and removes the short-circuit from across the attendant's telephone. Relay 237, released, releases relay 52 and transfers the lead 236 to steady battery at the front contact and innermost lower armature of relay 239. The lamp 234 is thus lighted steadily to indicate that the line ALC is busy.

*Removal of hold*

If the call is an incoming call from the private branch exchange, the hold condition will be removed and the circuit will restore to normal if the private branch exchange disconnects. Relay 242 releases when the private branch exchange disconnects and in turn, releases relay 237. The circuit is then restored to normal. If the attendant has put a hold condition on the line and wishes to remove it without disconnecting, the hold key G is operated momentarily. When ground is removed from the winding of relay 239, this relay releases. Relay 239, released, releases relay 238. When ground is reapplied to the winding of relay 239, relay 239 reoperates. Relay 239, operated, short circuits the windings of relay 242 causing the release of this relay. Relay 242, released, releases relay 237. The circuit is then in talking condition.

What is claimed is:

1. In a telephone system, a central office, a private branch exchange, an attendant's position thereat, substations, trunk circuits, means including one of said trunk circuits for extending a call from said central office to said attendant's position, a pickup key at said attendant's position for seizing the said one of said trunks, a hold key and a dial at said attendant's position, means in said trunk responsive to a momentary operation of said hold key for placing a hold condition on said trunk, and means responsive to the operation of said dial to extend the call on said trunk to one of said substations, switching means controlled by said pickup key when operated subsequent to the operation of said hold key and prior to the operation of said dial for removing the hold condition from said trunk, and means controlled by said hold key when momentarily reoperated subsequent to the operation of said dial for removing the hold condition from said trunk.

2. In a telephone system, a central office, a private branch exchange, an attendant's position thereat, substations, trunk circuits, means including one of said trunk circuits for extending a call from said central office to said attendant's position, a pickup key at said attendant's position for seizing the said one of said trunks, a hold key and a dial at said attendant's position, means responsive to a momentary operation of said hold key for placing a hold condition on said trunk, means controlled by said pickup key when operated subsequent to the operation of said hold key for removing the hold condition from said trunk, and means controlled by said dial when operated to extend the call on said trunk to one of said substations for rendering said pickup key-controlled means ineffective to remove the hold condition from said trunk.

3. A telephone system in accordance with claim 2 and which includes means responsive to the operation of said dial for rendering said hold key effective to remove the hold condition from said trunk.

4. In a telephone system, a central office, a private branch exchange, an attendant's position at said private branch exchange, substations, trunk circuits, a pickup key at said attendant's position, a hold key at said attendant's position, a lamp signal at said attendant's position, means including one of said trunk circuits for extending a call from said central office to said attendant's position and simultaneously operating said lamp signal in one manner, means controlled by said pickup key for seizing the said one of said trunks and simultaneously operating said lamp in a second distinctive manner, means responsive to the operation of said hold key for placing a hold condition on said trunk and for simultaneously operating said lamp in a third distinctive manner, a dial at said attendant's position, means responsive to the operation of said dial for transferring the call on said trunk to one of said substations, and means controlled by the receiver switchhook contacts at the said one of said substations for operating said lamp in a fourth distinctive manner.

5. In a telephone system, a central office, a private branch exchange, an attendant's position thereat, substations, trunk circuits, means including one of said trunk circuits for extending a call from said central office to said attendant's position, means at said attendant's position for completing said call to one of said substations, a switchhook at the said one of said substations having on-hook and off-hook positions, a signal at said attendant's position, means in the said one of said trunks for operating said signal in a distinctive manner in response to an on-hook condition at said substation of a predetermined time duration, and means in said trunk for operating said signal in a different distinctive manner in response to an on-hook condition at said substation of a duration less than the said predetermined time duration.

References Cited in the file of this patent

UNITED STATES PATENTS 2,056,752 Voss ---------------------- Oct. 6, 1936